(12) United States Patent
Zhang et al.

(10) Patent No.: US 11,300,828 B2
(45) Date of Patent: Apr. 12, 2022

(54) DISPLAY DEVICE

(71) Applicant: WUHAN CHINA STAR OPTOELECTRONICS TECHNOLOGY CO., LTD, Hubei (CN)

(72) Inventors: Peng Zhang, Hubei (CN); Guanghui Liu, Hubei (CN); Chao Wang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/769,618

(22) PCT Filed: Mar. 4, 2020

(86) PCT No.: PCT/CN2020/077700
§ 371 (c)(1),
(2) Date: Jun. 4, 2020

(87) PCT Pub. No.: WO2020/228395
PCT Pub. Date: Nov. 19, 2020

(65) Prior Publication Data
US 2021/0072594 A1    Mar. 11, 2021

(30) Foreign Application Priority Data

May 10, 2019  (CN) .......................... 201910387457.5
Jul. 29, 2019  (CN) .......................... 201910686797.8
Oct. 30, 2019  (CN) .......................... 201911045059.1

(51) Int. Cl.
*G02F 1/13357* (2006.01)
*G02F 1/1333* (2006.01)
*G02F 1/1335* (2006.01)

(52) U.S. Cl.
CPC .... *G02F 1/133605* (2013.01); *G02F 1/13338* (2013.01); *G02F 1/133514* (2013.01); *G02F 1/133528* (2013.01); *G02F 1/133603* (2013.01); *G02F 1/133606* (2013.01); *G02F 1/133607* (2021.01)

(58) Field of Classification Search
CPC ......... G02F 1/133605; G02F 1/133514; G02F 1/133603; G02F 1/13338; G02F 1/133528; G02F 1/133606; G02F 1/133607
See application file for complete search history.

(56) References Cited

U.S. PATENT DOCUMENTS

2015/0049505 A1*  2/2015  Wang ..................... G02B 6/002
                                                                    362/603

FOREIGN PATENT DOCUMENTS

CN          107784989 A  *  3/2018  ............... G09G 3/36

* cited by examiner

*Primary Examiner* — Donald L Raleigh
(74) *Attorney, Agent, or Firm* — Mark M. Friedman (57) ABSTRACT

A display device including a display panel and a backlight module are provided. The backlight module includes a backlight unit having a backlight hole; a light guide ring disposed inside the backlight hole, wherein the light guide ring comprises a light receiving surface provided away from the display panel and a light emitting surface provided near the display panel, and the light guide ring is configured to direct light beams to a display panel area corresponding to the backlight hole; and a light source component configured to provide a light source for the light guide ring.

18 Claims, 7 Drawing Sheets

DISPLAY DEVICE

FIELD OF INVENTION

The present invention relates to the field of display technologies, and more particularly, to a display device.

BACKGROUND

With development of liquid crystal display technology, especially that of full-screen technology, most manufacturers have currently set a backlight module of display devices with an inward opening, so that a camera under a screen can be placed correspondingly and receive incident light from external environment.

In a prior art display device, an opening will only serve as a channel of a camera under a screen to receive ambient light when the camera under the screen is correspondingly disposed below the opening of the backlight module of the display device. Since no light source is provided on an inner side of the opening to provide brightness, an area of the backlight module in the opening will be in an idle state and cannot provide any display effect when the display device is in use.

Therefore, a display device is urgently needed to solve the above technical problems.

SUMMARY

This application provides a display module to solve the technical problem that the camera area under the screen cannot be displayed in the existing display device.

To solve the above problems, the present application provides technical solutions as follows:

The present invention provides a display device comprising a display panel and a backlight module located on one side of the display panel, wherein the backlight module comprising:

a backlight unit having a backlight hole;

a light guide ring disposing inside the backlight hole, wherein the light guide ring comprises a light receiving surface provided away from the display panel and a light emitting surface provided near the display panel, and the light guide ring is configured to direct light beams to a display panel area corresponding to the backlight hole, and a light source component configured to provide a light source for the light guide ring.

In the display device of the present application, the light source component comprises a driving circuit board and at least one light source disposed on the driving circuit board, and the light source is arranged in an array over the driving circuit board, and the light sources are distributed around inside or outside of the backlight hole; and one side of the light source faces the light receiving surface of the light guide ring.

In the display device of the present application, a plane on which the light emitting surface is located is perpendicular to or at an acute angle with a plane on which the light receiving surface is located.

In the display device of the present application, the light guide ring further comprises a light reflecting surface, and a plane on which the light reflecting surface is located is perpendicular to or at an acute angle with a plane on which the light receiving surface is located.

In the display device of the present application, wherein the light receiving surface is integrally formed by at least one Fresnel lens located on the same plane.

In the display device of the present application, the Fresnel lens has at least one annular tooth-shaped structure arranged concentrically, and a convex lens structure surrounded by the annular tooth-shaped structure.

In the display device of the present application, the light emitting surface is integrally formed by at least one microlens film located on the same plane, and a plane on which the light receiving surface is located overlap a plane on which a focal point of the microlens film is located, and the light receiving surface is provided with at least one light transmitting hole, and each light-transmitting hole is disposed corresponding to each of the microlens films.

In the display device of the present application, the light emitted by the light source is refracted by the microlens film to form parallel light beams perpendicular to the light receiving surface when the light transmitting hole overlaps the focal point of the microlens film; or the light emitted by the light source is refracted by the microlens film to form parallel light beams at a certain angle with an incident surface when the light transmitting hole is out of focus and is at the focal plane of the microlens film.

In the display device of the present application, the light guide components further comprises a metal reflective layer, and the metal reflective layer is disposed on the light receiving surface of the light guide ring at a side toward the light source, and the light transmitting holes are arranged in an array form on the metal reflective layer.

In the display device of the present application, the light source component further comprises a diffused reflection layer, and the diffused reflection layer is disposed on the driving circuit board, and the light source is exposed on the diffused reflection layer.

In the display device of the present application, each light transmitting hole is located on a side of the focal point of each corresponding microlens film away from the center of the light guide ring.

In the display device of the present application, the light source comprises one of an light emitting diode (LED) light source or a mini LED light source.

In the display device of the present application, the display device further comprises a camera module located on a side of the display module away from the display panel, and the camera module corresponds to the backlight hole; and a control component electrically connected to the camera module and the light source component, wherein the control component controls the light source to be turned off when the camera in the camera module is turned on, and the control component controls the light source to be turned on or off when the camera in the camera module is turned off.

In the display device of the present application, the backlight module further comprises a light blocking film, and the light blocking film is disposed between the light guide ring and the backlight unit.

In the display device of the present application, the light guide ring is made of transparent materials or matte materials.

In the display device of the present application, the backlight unit comprises a reflection sheet on a back plate, a light guide plate on the reflection sheet, a diffusion sheet on the light guide plate, and a lower enhancement sheet on the diffusion sheet, and an upper enhancement sheet on the lower enhancement sheet, wherein the backlight hole sequentially penetrates the back plate, the reflection sheet, the light guide plate, the diffusion sheet, the lower light enhancement sheet, and the upper light enhancement sheet from bottom to top.

In the display device of the present application, the display panel comprising:

a lower polarizer disposed on the backlight module;

an array substrate provided on the lower polarizer;

a color filter substrate provided on the array substrate; and an upper polarizer disposed on the color filter substrate, wherein the lower polarizer and the upper polarizer are provided with through holes at positions corresponding to the backlight holes.

Advantageous effects of the present invention are that a light source provided by a light source component can be guided to a display panel area corresponding to a backlight hole through a light guide ring by setting the backlight hole in a corresponding area of a camera module and the light guide ring in the backlight hole. The light source is turned off when a camera in the camera module is activated, and the light source is turned on or off when the camera in the camera module is not activated, so that a through hole or a blind hole on the display panel can have display capability again, while still maintaining image quality of the camera module.

BRIEF DESCRIPTION OF DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

Please refer to the drawings, in which the same reference numerals represent the same components. The following description is based on specific embodiments of the present invention as illustrated and should not be construed as limiting the specific embodiments that are not described herein.

In the description of the present invention, it should be understood that the terms "upper", "lower", "front", "rear", "left", "right", "inside", "outside", "sidewall", etc. or the positional relationship is based on the orientation or positional relationship shown in the drawings, only for the convenience of describing the present invention and simplifying the description, rather than indicating or implying that the device or element referred to must have a specific orientation, structure and operation in a specific orientation, Therefore, it cannot be understood as a limitation to the present invention. In the figures, similarly structured units are denoted by the same reference numerals.

In a prior art display device, an opening will only serve as a channel of a camera under a screen to receive ambient light when the camera under the screen is correspondingly disposed below an opening of a backlight module of the display device. Since no light source is provided on an inner side of the opening to provide brightness, an area of the backlight module in the opening will be in an idle state and cannot provide any display effect when the display device is in use. The present application provides a display device based on the above technical problems.

Figure 1:
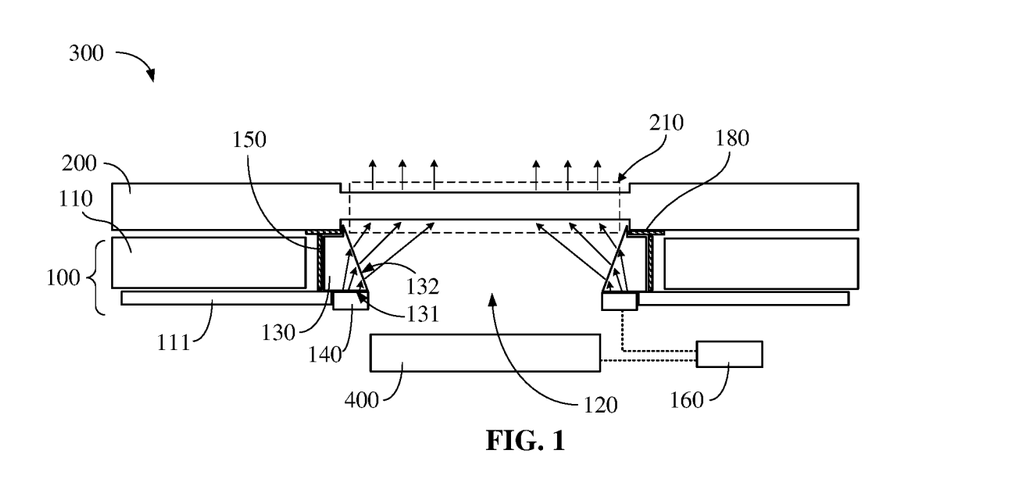
FIG. 1 is a first structural diagram of a display device of the present application.

Referring to FIG. 1, the display device 300 comprises a display panel 200 and a backlight module 100 on one side of the display panel 200. The backlight module 100 comprises a backlight unit 110 provided with a backlight hole 120.

In this embodiment, the backlight hole 120 may be a circular hole.

A light guide ring 130 is disposed inside the backlight hole 120. The light guide ring 130 comprises a light receiving surface 131 disposed away from the display panel 200 and a light emitting surface 132 disposed near the display panel 200. Light beams entering the light guide ring 130 can be directed to a display panel area 210 corresponding to the backlight hole 120. A shape and size of the light guide ring 130 are adapted to a shape and size of the backlight hole 120.

A light source component 140 is configured to provide a light source for the light guide ring 130. A shape and size of the light source component 140 are adapted to a shape and size of the light guide ring 130.

In this embodiment, the light source component 140 comprises a driving circuit board 141 and at least one light source 142 disposed on the driving circuit board 141. The light source 142 can be arranged in an array on the driving circuit board 141. The light source can be distributed around the inside or outside of the backlight hole. One side of the light source 142 faces the light receiving surface 131 of the light guide ring 130.

In this embodiment, the display device 300 may further comprise a camera module 400 located on one side of the backlight module 100 and away from the display panel 200, and the camera module 400 corresponds to the backlight hole 120. An orthographic projection of the camera module 400 on the backlight unit 110 is located in the backlight hole 120.

In this embodiment, whether the display device 300 is provided with the camera module 400 is not specifically limited in this application.

The present application provides the display device 300 comprising the display panel 200, the backlight module 100, and the camera module 400. The backlight module 100 comprises the backlight unit 110 disposed with a backlight hole 120. The camera module 400 corresponds to the backlight hole 120. The light guide ring 130 is provided inside the backlight hole 120. The light guide ring 130 comprises the light receiving surface 131 and the light emitting surface 132. The light guide ring 130 is used to guide light beams entering the light guide ring 130 to the display panel area 210 corresponding to the backlight hole 120. The light source component 140 is configured to provide a light source for the light guide ring 130. In this application, the backlight hole 120 is disposed in the area corresponding to the camera module 400 and a light guide ring 130 is disposed in the backlight hole 120, so that the light source provided by the light source component 140 can be guided to the display panel area 210 corresponding to the backlight hole 120. The light source 142 is turned off when the camera in the camera module 400 is activated, and the light source 142 is turned on or off when the camera in the camera module 400 is not activated, so that the through hole or blind hole of the display panel 200 can have the display capability again, while still maintaining the image quality of the camera module 400.

Technical solutions of the present application will be described below with reference to specific embodiments.

Embodiment 1

Figure 2:
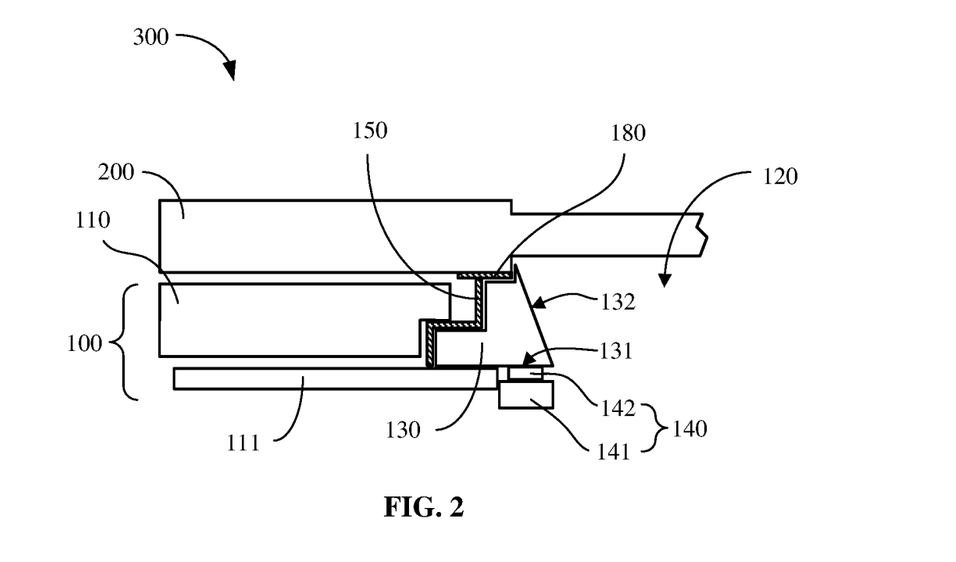
FIG. 2 is a second structural diagram of a display device of the present application.
Figure 3:
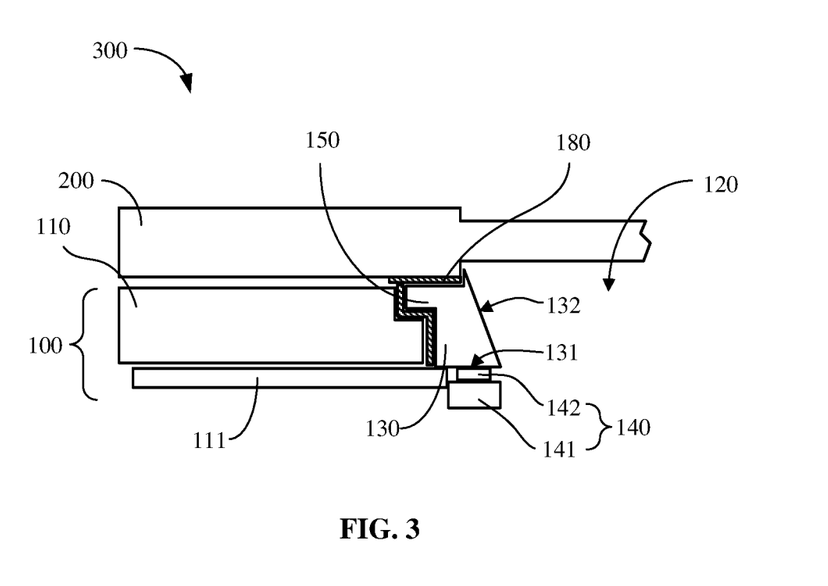
FIG. 3 is a third structural diagram of a display device of the present application.

Please refer to FIGS. 1-3, a plane where the light emitting surface 132 is located and a plane where the light receiving surface 131 is located are at an acute angle.

Referring to FIG. 1, an included angle between the light emitting surface 132 and the light receiving surface 131 is an acute angle. In practical applications, the included angle between the light emitting surface 132 and the light receiving surface 131 may be 10 degrees, 20 degrees, 30 degrees, 45 degrees, 50 degrees, 60 degrees, 70 degrees, 80 degrees, etc. to protect light beams entering from the light receiving surface 131.

When light is emitted from the light emitting surface 132, it is projected onto the display panel area 210 corresponding to the backlight hole 120 to compensate for the additional light source of the display panel area 210 corresponding to the camera module 400, so that this part of the area of the display panel 200 can display normally without affecting the normal operation of the camera module 400.

In this embodiment, the backlight module 100 further comprises a light blocking film 150. The light blocking film 150 is disposed between the light guide ring 130 and the backlight unit 110. The light blocking film 150 is used to block the light from the backlight module 100 and to prevent the light module 150 from being affected by the light emitted from the light source 142 of the backlight module 100 when the camera module 400 is shooting.

Based on FIG. 1, the light guide ring 130 of the display device 300 can be further changed based on different designs of the backlight unit 110, and corresponding changes are shown as the exemplary cross-sectional structures in FIG. 2 or FIG. 3. Through the setting of the light emitting surface 132 of the light guide ring 130, light beams emitted by the light source component 140 is guided to be emitted toward the display panel area 210 corresponding to the backlight hole 120, thereby providing appropriate brightness to the display panel area 210 corresponding to the backlight hole 120.

Figure 4:
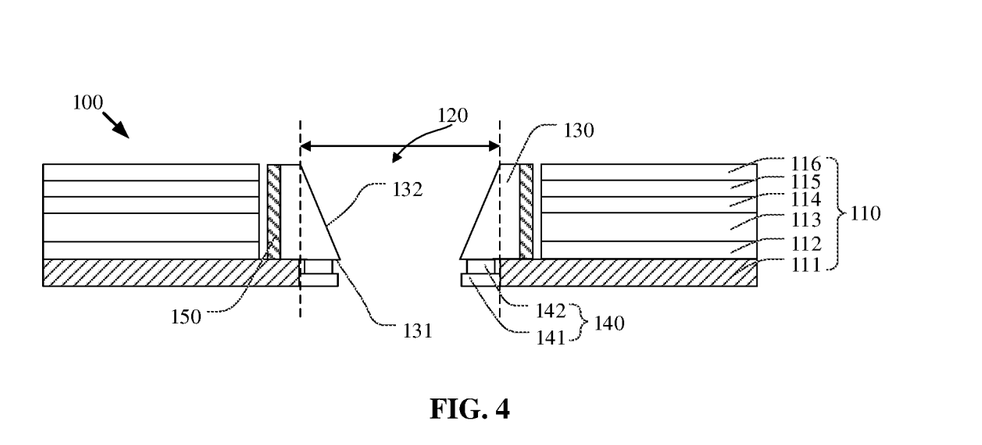
FIG. 4 is a first schematic structural diagram of a backlight module in a display device of the present invention.

In this embodiment, when the light guide ring 130 is disposed as the cross-sectional structure shown in FIG. 3 or FIG. 4, the shape of the light blocking film 150 provided at the boundary between the light guide ring 130 and the backlight unit 110 will also be changed correspondingly to effectively block leakage of the light out of the backlight unit 110 to the central area of the backlight hole 120, so as to prevent affecting the imaging quality of the camera module 400.

In this embodiment, the light source 142 may comprise of one of a light emitting diode (LED) light source or a mini LED light source. The light source part 140 in the following embodiments may be the same as this embodiment.

In this embodiment, the light guide ring 130 may be made of transparent materials or matte materials. The transparent light guide ring 130 can effectively guide light beams emitted by the light source component 140 through the light emitting surface 132 toward the display panel area 210 corresponding to the backlight hole 120, thereby reducing the light loss phenomenon of the light source component 140. Materials of the light guide ring 130 in the following embodiments may be the same as that in this embodiment.

Referring to FIG. 1, the display device 300 further comprises a control component 160.

The control component 160 is electrically connected to the camera module 400 and the light source component 140, respectively. The control component 160 is configured to turn off the light source component 140 when the camera module 400 is started, so that the camera module 400 can obtain external image data without interference. When the camera module 400 is turned off, the light source component 140 can be controlled to be turned on or off according to the actual display conditions of the display panel 200.

In this embodiment, when the camera module 400 is activated, the light source component 140 will be turned off, so that the camera module 400 can receive the ambient light source from the outside for light sensing without being affected. When the camera module 400 is not activated, the light source component 140 can be turned on according to the actual display conditions of the display panel 200 and emits light beams toward the display panel area 210 of the display panel 200 to provide brightness.

Alternatively, the light source component 140 can be turned off without emitting light beams toward the display panel area 210 of the display panel 200 when the camera module 400 is not displaying to make the display panel area 210 corresponding to the backlight hole 120 be in a completely black state, so that the display panel 200 that is in an idle state and cannot provide any display effect in the prior art can have a display capability again and still maintain the image quality that can be obtained by the camera under the screen, thereby improving the application scenarios and user experience of terminal products (i.e, the display panel 200 with full-screen technology), so as to be competitive.

In this embodiment, a backlight hole 120 is provided in an area corresponding to the camera module 400 and a light guide ring 130 is provided in the backlight hole 120, so that the light source provided by the light source component 140 can be guided to the display panel area 210 corresponding to the backlight hole 120 through the light guide ring 130. When the camera in the camera module 400 is activated, the light source 142 is turned off, and when the camera in the camera module 400 is not activated, the light source 142 is turned on or off, so that the display panel 200 can be turned on and make the through hole or blind hole have the display capability again, and still maintain the image quality of the camera module 400.

Embodiment 2

The present embodiment is the same as or similar to Embodiment 1, except that:

Based on FIGS. 1-3, the surface of the light emitting surface 132 may further have a microstructure, so that the light emitted from the light emitting surface 132 can be distributed as evenly as possible inside the backlight hole 120 due to the setting of the microstructure. Therefore, the display panel area 210 corresponding to the backlight hole 120 has uniform brightness.

Figure 5:
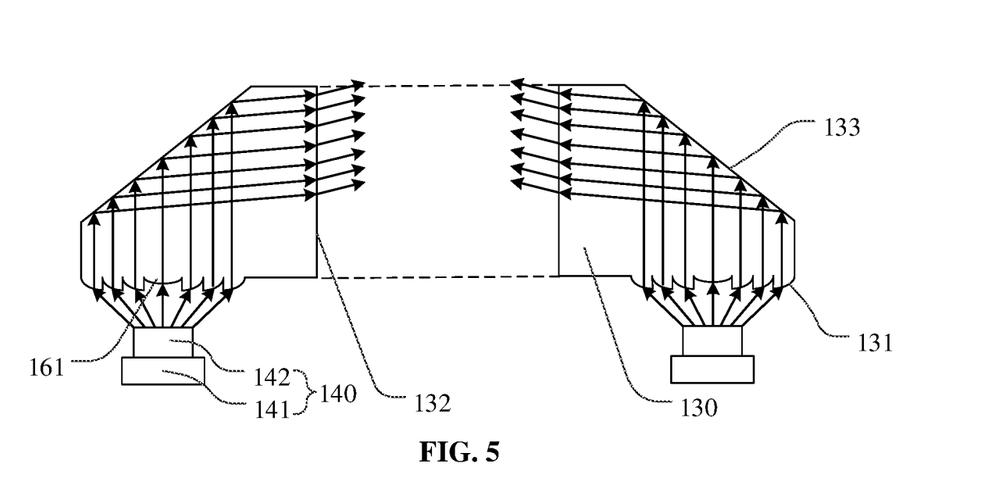
FIG. 5 is a first schematic structural diagram of a light source component in a display device of the present invention.
Figure 6:
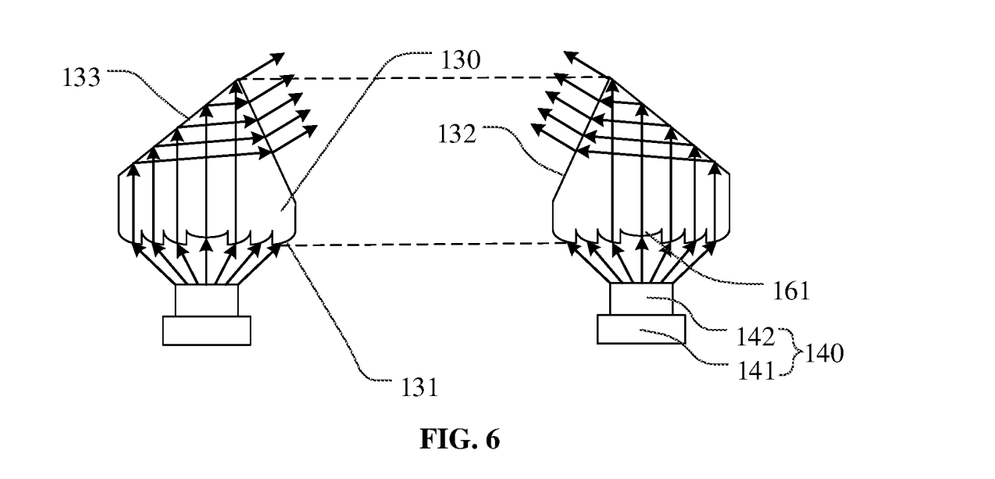
FIG. 6 is a schematic structural diagram of a light guide ring and a light source in a display device of the present invention.

Please refer to FIGS. 4 to 6, the plane where the light emitting surface 132 is located is perpendicular to or at an acute angle with the plane where the light incident surface 131 is located.

In this embodiment, when the plane on which the light emitting surface 132 is located and the plane on which the light incident surface 131 is located at an acute angle, it is convenient for light to be directed upward, that is, along the aperture direction of the backlight hole 120, when it is refracted from the light emitting surface 132 into the backlight hole 120.

In this embodiment, the backlight hole 120 is used for accommodating the camera module 400, or the backlight hole 120 is disposed corresponding to the lens position of the camera module 400.

In this embodiment, the display device 300 also comprises the same control components (not shown) as those in the first embodiment. The control components may control the light source component 140 and the camera module 400 according to an actual situation.

When the camera in the camera module 400 is turned on, the light source component 140 is in a non-working state, and the backlight hole 120 serves as a channel for the camera module 400 to receive ambient light. When the camera in the camera module 400 is turned off, the light source component 140 is in a working state, and light emitted by the light source 142 in the light source component 140 passes through the light guide ring 130 to provide light for the backlight hole 120.

In this embodiment, the light guide ring 130 has a function of totally reflecting and refracting light, so that the light can propagate to the area of the backlight hole 120 as much as possible. In this embodiment, a light guide ring 130 and a light source component 140 are provided inside the backlight hole 120, thereby providing a light source inside the backlight hole 120, which solves the problem that the color of the corresponding position of the backlight hole 120 is dark when the camera is turned off.

In this embodiment, the backlight module 100 further comprises a light blocking film 150, which is disposed between the light guide ring 130 and the backlight unit 110. The purpose of providing the light blocking film 150 is to block the light of the backlight module 100 and prevent the light from being affected by the light emitted from the light source component 140 of the backlight module 100 when the camera is shooting.

Referring to FIGS. 5-6, a light reflecting surface 133 is further included on a side of the light guide ring 130 near the light blocking film 150. The plane on which the light reflecting surface 133 is located is perpendicular to or at an acute angle with the plane on which the light receiving surface 131 is located.

In this embodiment, the light from the light source 142 (the arrows in FIG. 5 and FIG. 6 indicate the direction of light propagation) enters the light guide ring 130 from the light receiving surface 131, and is reflected by the light reflecting surface 133 to make the light from The light emitting surface 132 is emitted into the backlight hole 120 to provide light to the backlight hole 120. The plane where the light reflecting surface 133 is located is at an acute angle with the plane where the light incident surface 131 is located, which is more convenient for the light from the light source 142 to enter the light guide ring 130 from the light receiving surface 131 and then enter the backlight hole 120 through reflection.

Please refer to FIG. 4, the light guide ring 130 comprises the light receiving surface 131 and the light emitting surface 132 but does not comprise the light reflecting surface 133. The plane where the light emitting surface 132 is located is at an acute angle with the plane where the light incident surface 131 is located.

Please refer to FIG. 5, the plane where the light emitting surface 132 is located is perpendicular to the plane where the light receiving surface 131 is located, and the plane where the light reflecting surface 133 is located is at an acute angle with a plane where the light incident surface 131 is located.

Referring to FIG. 6, the plane where the light emitting surface 132 is located is at an acute angle with the plane where the light receiving surface 131 is located, and the plane where the light reflecting surface 133 is located is also at an acute angle with the plane where the light receiving surface 131 is located.

The specific embodiments of the present application are not limited to the above-mentioned structures of the light guide ring 130. As long as the light emitted by the light source 142 passes through the light guide ring 130 and enters the backlight hole 120, they all belong to the scope of the present invention.

In this embodiment, the material of the light guide ring 130 may be plastic or optical-grade glass, and its material preferably has a certain refractive index, so that light can propagate to the area of the backlight hole 120 as much as possible.

Figure 7:
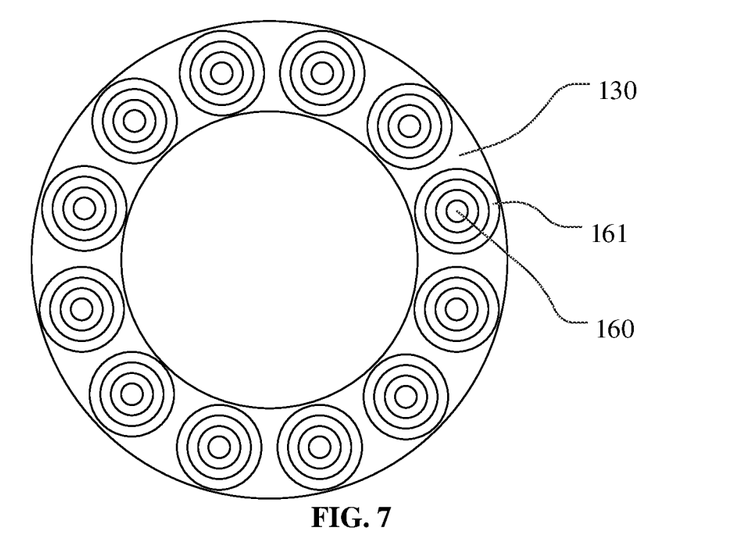
FIG. 7 is a first bottom view of a light guide ring in a display device of the present invention.

Referring to FIG. 7, the light receiving surface 131 may be integrally formed by a plurality of Fresnel lenses 160 on the same plane. That is, a plurality of the Fresnel lenses 160 are distributed in a ring shape on the light receiving surface 131.

In this embodiment, the light source 142 and the Fresnel lens 160 are arranged one-to-one correspondingly. The number of the light source 142 and the Fresnel lens 160 are equal.

In this embodiment, the light source 142 is located at a focal position of the Fresnel lens 160. The light emitted by any one of the light sources 142 can pass through the corresponding Fresnel lens 160 to form parallel light. Please refer to FIGS. 5 to 6 for details.

Referring to FIG. 7, the Fresnel lens 160 has a plurality of concentrically arranged annular tooth structures 161 and a convex lens structure surrounded by the annular tooth-shaped structures 161. The Fresnel lens 160 is also called a threaded lens, and is made of a thin sheet made of polyolefin material or made of glass. One side of the Fresnel lens 160 is a plane, and concentric circles from small to large are formed on the other side. The optical material is removed as much as possible to reduce the thickness, and the curvature of the surface is retained to form the concentric arrangement of the annular tooth-shaped structure 161.

Referring to FIGS. 5-6, the light source 142 emits light at the focal position of the Fresnel lens 160, and the light enters from the side of the annular tooth-shaped structure 161 and passes through the Fresnel lens 160 to emit parallel light.

Therefore, the Fresnel lens 160 in this embodiment is equivalent to the ordinary Fresnel lens 160 with a thinned effect.

In this embodiment, the shape and size of the driving circuit board 141 are adapted to the shape and size of the light guide ring 130, that is, they are arranged in a ring shape.

In this embodiment, the light source 142 may be disposed in an array on the driving circuit board 141.

Since the light shape of the light source 142 is relatively divergent, in order to better implement the light guiding function and utilize the light effect as much as possible, the light receiving surface 131 of the light guide ring 130 may comprise a plurality of the Fresnel lenses 160. The light source 142 may be located at a focal position of the Fresnel lens 160 to achieve a large-angle light collimation effect of the light source, thereby preventing the problem of light leakage of the backlight module 100 caused by divergent light.

Referring to FIG. 4, the light receiving surface 131 of the light guide ring 130 is clamped on the back plate 111, and the light source 142 and the upper surface of the back plate 111 are in the same plane. This is more conducive to fixing the light guide ring 130 inside the backlight hole 120. Of course, in other embodiments, the light source 142 and the light receiving surface 131 may also be disposed at other positions of the light guide ring 130, and their deformations all belong to the protection scope of the present invention.

By providing the light guide ring 130 and the light source part 140 inside the backlight hole 120, the display device 300 provided in this embodiment solves the problem of no brightness provided by the light source inside the backlight hole 120, as well as solves the problem that the colors of the display device 300 are relatively dark at the corresponding position of the backlight hole 120 when the camera is turned off to enter the display state.

Embodiment 3

The present embodiment is the same as or similar to Embodiment 2, except that:

Referring to FIGS. 8-12, the light emitting surface 132 is integrally formed by a plurality of microlens films 170 on the same plane.

In this embodiment, the microlens films 170 are distributed annularly on the light emitting surface 132. The plane where the light receiving surface 131 overlaps the plane where the focal point O of the microlens films 170 is located. The light receiving surface 131 is provided with a plurality of light transmitting holes 171, and each light transmitting hole 171 is provided corresponding to each microlens film 170, so that the light emitted by the light source 142 is allowed to enter through the light receiving surface 131 and is refracted from the microlens film 170 of the light emitting surface 132, so as to obtain a parallel beam that is finally emitted.

In this embodiment, the setting of the light source component 140 may be the same as that of the second embodiment. The driving circuit board 141 may be a flexible circuit board, which is made of a polyimide or polyester film as a substrate, and has the characteristics of high wiring density, light weight, and thin thickness.

In this embodiment, the light transmitting hole 171 may be located on a plane where the focal point O of the microlens film 170 is located. That is, the light transmitting hole 171 is located at the focal plane of the microlens film 170, and the direction of the main light beams becomes directional after most of the light passes through the microlens film 170. This direction is related to the light transmitting hole 171 and the position of the focal point O of the microlens film 170.

In this embodiment, when the light transmitting hole 171 overlaps the focal point O of the microlens film 170, the light emitted by the light source 142 (indicated by arrows in FIG. 8 and FIG. 9) is refracted by the microlens film 170 and forms parallel light beams perpendicular to the light receiving surface 131. When the light transmitting hole 171 deviates from the focal point O and is at the focal plane of the microlens film 170, the light emitted by the light source 142 is refracted by the microlens film 170 to form parallel light beams at a certain angle with the incident surface.

Figure 8:
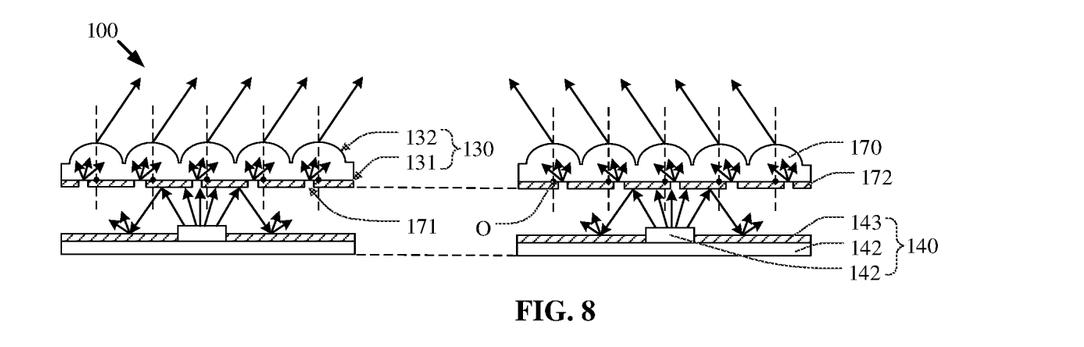
FIG. 8 is a second schematic structural diagram of a backlight module in a display device of the present invention.
Figure 9:
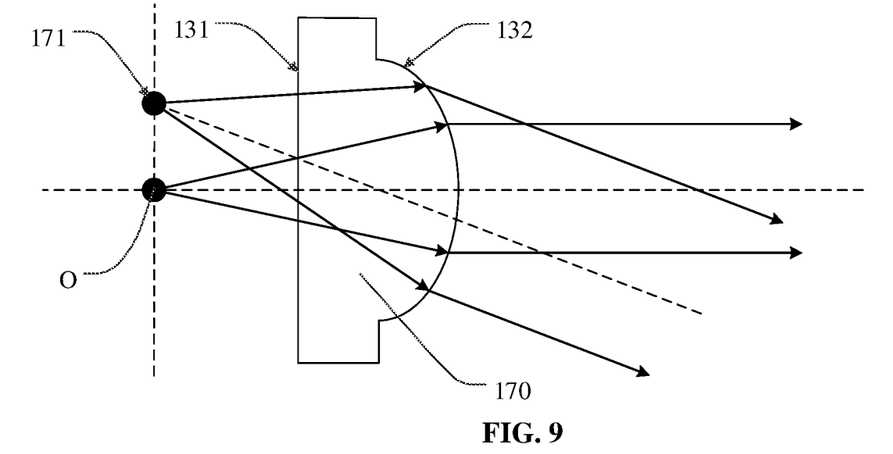
FIG. 9 is a schematic diagram of a light path principle of a microlens film in a display device of the present invention.

Therefore, in this embodiment, the position of the light transmitting hole 171 relative to the focal point O of the microlens film 170 can be adjusted to control the light out direction of the incident light, so that the light emitted by the light source 142 can be guided to a certain direction.

Referring to FIG. 8, the backlight module 100 further comprises a metal reflective layer 172. The metal reflective layer 172 is disposed on a side of the light receiving surface 131 of the light guide ring 130 facing the light source 142. A plurality of light transmitting holes 171 are arranged in an array on the metal reflective layer 172.

In this embodiment, the plane where the light incident surface 131 overlaps the plane where the focus O of the microlens film 170 is located, so that the plane where the metal reflective layer 172 is located overlaps the plane where the focal point O of the microlens film 170 is located, that is, the light transmitting hole 171 is located in the plane where the focal point O of the microlens film 170 is located.

In this embodiment, the light transmitting hole 171 is provided so that light emitted from the light source 142 can be regarded as a point light source.

Referring to FIG. 8, the light source component 140 further comprises a diffused reflection layer 143. The diffused reflection layer 143 is disposed on the driving circuit board 141, and the light source 142 is exposed on the diffused reflection layer 143.

In this embodiment, the diffused reflection layer 143 is used to reflect light that has not passed through the light transmitting hole 171, and the diffused reflection layer 143 and the metal reflective layer 172 are disposed in parallel. The light that has not passed through the light transmitting hole 171 is reflected by the metal reflective layer 172 and then diffusely reflected by the diffused reflection layer 143, so that the space between the metal reflective layer 172 and the diffused reflection layer 143 is filled with light of a random direction, so that the light emitted from the light source 142 is used multiple times. The invention repeatedly uses the light reflected multiple times, thereby reducing the light efficiency loss and achieving the energy saving effect.

In this embodiment, the material of the diffused reflection layer 143 may comprise a white ink, which has a good reflective effect and does not absorb light easily.

In this embodiment, each light transmitting hole 171 is located on a side of the focal point O of each microlens film 170 corresponding to the focal point O away from the center of the light guide ring 130. The distance between the centers of the two adjacent light transmitting holes 171 is equal to the pitch of the focal points O of the two adjacent microlens films 170. In this way, the light transmitting hole 171 deviates from the focus O of the microlens film 170, and the light emitted by the light source 142 is refracted by the microlens film 170 to form parallel light beams at an angle with the incident surface, and the light beams are all directed to one side of the center of the light guide ring 130.

Figure 10:
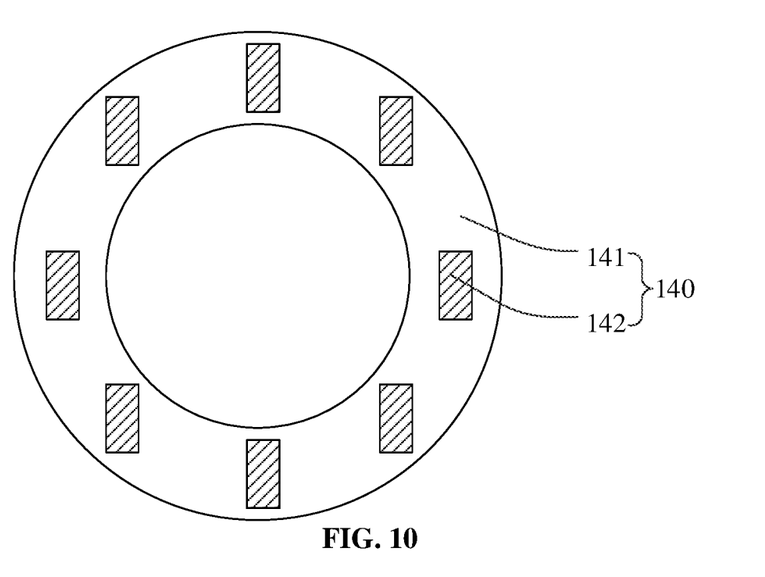
FIG. 10 is a first schematic structural diagram of a light source component in a display device of the present invention.
Figure 11:
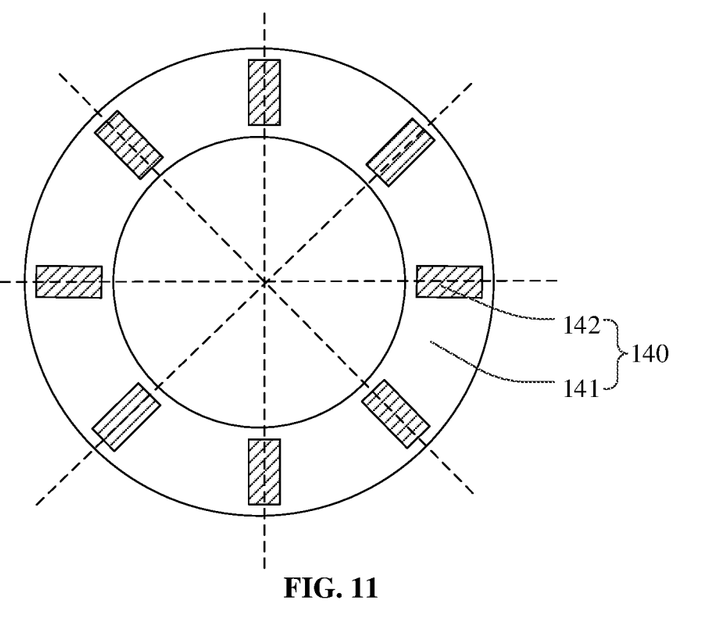
FIG. 11 is a second schematic structural diagram of a light source component in a display device of the present invention.

Please refer to FIGS. 10-11, the light sources 142 are arranged in an array on the driving circuit board 141. One side of the light sources 142 is a light emitting side. The light sources 142 are arranged in an array in various forms.

Please refer to FIG. 10, the arrangement directions of the light sources 142 are the same.

Referring to FIG. 11, the intersection of the arrangement directions of the light sources 142 is the center point of the driving circuit board 141.

In this embodiment, the light transmitting hole 171 is located in a plane where the focal point O of the microlens film 170 is located. The light transmitting hole 171 does not coincide with the focal point O and is away from the side of the backlight hole 120. In this way, the light emitted by the light source 142 enters the microlens film 170 through the light transmitting hole 171 and is refracted and emitted, so that parallel light beams can be formed toward the backlight hole 120.

In this embodiment, the shape and size of the backlight module 100 are adapted to the shape and size of the backlight hole 120. The backlight hole 120 is preferably a circular hole.

In this embodiment, the light guide ring 130 and the light source 142 both have a ring shape, preferably a circular ring shape, that is, when the backlight hole 120 is preferably a circular hole, the light guide ring 130 and the light source 142 are both circular.

Figure 12:
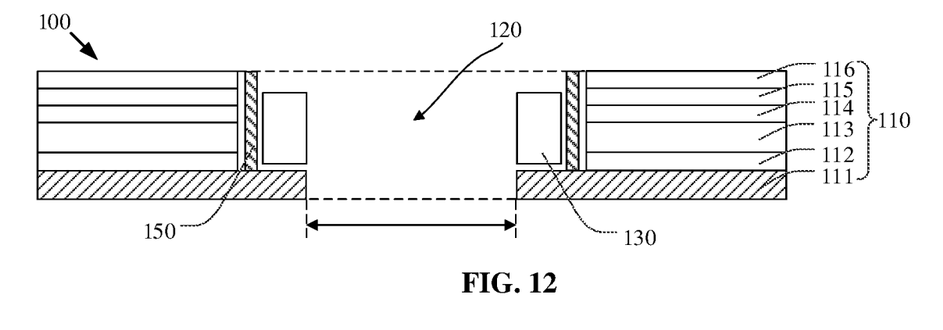
FIG. 12 is a second schematic structural diagram of a backlight module in a display device of the present invention.

Please refer to FIG. 12, the backlight module 100 further comprises a light blocking film 150. The light blocking film 150 is disposed between the backlight module 100 and the backlight unit 110. The purpose of providing the light blocking film 150 is to block the light of the backlight module 100 and prevent the light module 142 from being affected by the light source 142 of the backlight module 100 when the camera is shooting.

By providing the light guide ring 130 and the light source 142 inside the backlight hole 120, the display device 300 provided in this embodiment solves the problem of no brightness provided by the light source inside the backlight hole 120, as well as solves the problem of dimmed brightness at the corresponding position of the backlight hole 120 of the display device 300 when the camera is turned off to enter the display state.

In the above embodiment, the display device 300 may further comprise a light shielding adhesive 180 located between the backlight module 100 and the display panel 200.

The present application uses the embodiment 2 as an example for description. Please refer to FIG. 13.

Figure 13:
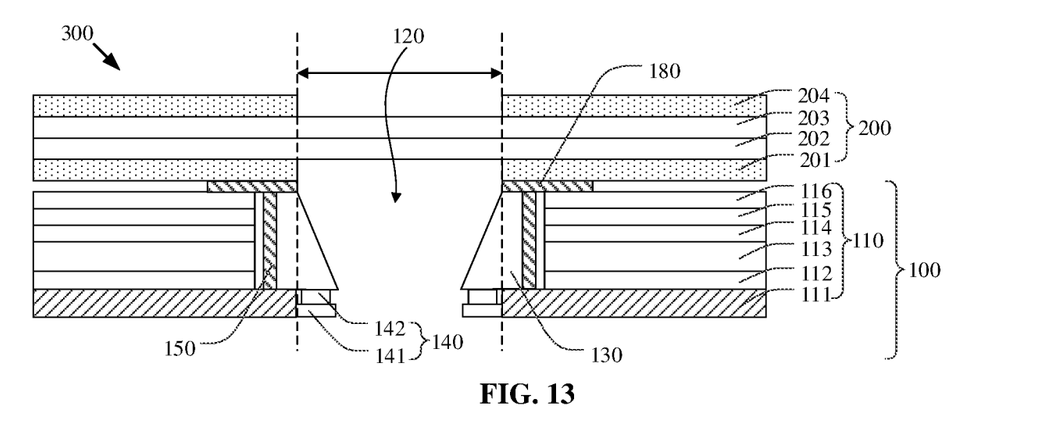
FIG. 13 is a fourth structural diagram of a display device of the present application.

A part of the lower surface of the light shielding adhesive 180 is attached to the upper surface of the light guide ring 130, and another part is attached to the upper surface of the upper light enhancing sheet 116 (i.e. the upper surface of the backlight module 100).

The upper surface of the light shielding adhesive 180 is attached to the lower surface of the display panel 200, so that the light shielding adhesive 180 adheres the backlight module 100 and the display panel 200 together. The light shielding adhesive 180 plays a role of connecting the backlight module 100 and the display panel 200, and can prevent light leakage from the position of the backlight hole 120. Therefore, the shape and size of the light shielding adhesive 180 match the shape and size of backlight hole 120, that is, the light shielding adhesive 180 surrounds the backlight hole 120 in a ring shape, that is, the light shielding adhesive 180 is not provided at a position corresponding to the backlight hole 120.

In the above embodiment, the backlight unit 110 may comprise a reflection sheet 112, a light guide plate 113, a diffusion sheet 114, a lower light enhancement sheet 115, and an upper light enhancement sheet 116, which are sequentially stacked from bottom to top.

The reflection sheet 112 is disposed on the back plate 111. The light guide plate 113 is disposed on the reflection sheet 112. The diffusion sheet 114 is disposed on the light guide plate 113, and the lower light enhancement sheet 115 is disposed on the diffusion sheet 114. The upper light enhancement sheet 116 is disposed on the lower light enhancement sheet 115.

The backlight hole 120 penetrates the back plate 111, the reflection sheet 112, the light guide plate 113, the diffusion sheet 114, the lower light enhancement sheet 115, and the upper light enhancement sheet 116 in this order from bottom to top.

The diffusion sheet 114 diffuses light to provide a uniform surface light source. The lower light enhancement sheet 115 and the upper light enhancement sheet 116 can enhance the brightness of the light source. The lighting effect of the backlight unit 110 will directly affect the visual effect of the backlight module 100.

In the above embodiment, the display panel 200 comprises a lower polarizer 201, an array substrate 202, a color filter substrate 203, and an upper polarizer 204. Please refer to FIG. 13 for details.

In this embodiment, the lower polarizer 201 is disposed on the backlight module 100. The array substrate 202 is disposed on the lower polarizer 201, and the color filter substrate 203 is disposed on the array substrate 202. The upper polarizer 204 is provided on the color filter substrate 203, wherein the lower polarizer 201 and the upper polarizer 204 are provided with through holes at positions corresponding to the backlight holes 120, and the through holes can improve the light transmittance of the display panel 200. The upper surface of the light shielding adhesive 180 is adhered to the lower surface of the lower polarizer 201 to bond the backlight module 100 and the display panel 200 together.

The display device 300 may be installed in the display panel 200 having through holes (such as digging holes, water-drop shaped holes, notches, and out-of-planes holes) or blind holes, thereby eliminating issues such as inability of the through holes or the blind holes to be used for displaying when the display panel 200 has through holes or blind holes. Moreover, the backlight unit 110 can use a back plate 111 or a reflective film as a back surface to uniformly or effectively use light emitted by the backlight unit 110.

In summary, the arrangement of the light guide ring 130 and the light source component 140 of the present disclosure enables the backlight module 100 of the display device 300 to provide light and brightness control, thereby enabling the through holes or blind holes on the display panel 200 that are in an idle state and cannot provide any display effect to have the display capability again, while still maintaining the image quality that the camera module 400 can obtain. It will further enhance the application scenarios and user experience of terminal products, and thus be competitive.

The display device in this embodiment may be any product or component having a display function such as a mobile phone, a tablet computer, a television, a display, a notebook computer, a digital photo frame, a navigator, and the like.

A display device comprising a display panel and a backlight module are provided. The backlight module comprises a backlight unit having a backlight hole; a light guide ring disposed inside the backlight hole, wherein the light guide ring comprises a light receiving surface provided away from the display panel and a light emitting surface provided near the display panel, and the light guide ring is configured to direct light beams to a display panel area corresponding to the backlight hole; and a light source component configured to provide a light source for the light guide ring. The light source provided by the light source component can be guided to the display panel area corresponding to the backlight hole through the light guide ring by setting the backlight hole in a corresponding area of a camera module and the light guide ring in the backlight hole. The light source is turned off when a camera in the camera module is activated, and the light source is turned on or off when the camera in the camera module is not activated, so that a through hole or a blind hole on the display panel can have display capability again, and still maintain image quality of the camera module.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A display device comprising a display panel and a backlight module located on one side of the display panel, wherein the backlight module comprises:
   a backlight unit having a backlight hole;
   a light guide ring disposed inside the backlight hole, wherein the light guide ring comprises a light receiving surface provided away from the display panel and a light emitting surface provided near the display panel, and the light guide ring is configured to direct light beams to a display panel area corresponding to the backlight hole; and
   a light source component configured to provide a light source for the light guide ring,
   wherein the backlight unit comprises a reflection sheet on a back plate, a light guide plate on the reflection sheet, a diffusion sheet on the light guide plate, a lower enhancement sheet on the diffusion sheet, and an upper enhancement sheet on the lower enhancement sheet, wherein the backlight hole sequentially penetrates the back plate, the reflection sheet, the light guide plate, the diffusion sheet, the lower light enhancement sheet, and the upper light enhancement sheet from bottom to top.

2. The display device according to claim 1, wherein the light source component comprises a driving circuit board and at least one light source disposed on the driving circuit board, the at least one light source is arranged in an array over the driving circuit board, and the at least one light source is distributed around inside or outside of the backlight hole; and
   one side of the at least one light source faces the light receiving surface of the light guide ring.

3. The display device according to claim 2, wherein a plane on which the light emitting surface is located is perpendicular to or at an acute angle with a plane on which the light receiving surface is located.

4. The display device according to claim 2, wherein the light guide ring further comprises a light reflecting surface, and a plane on which the light reflecting surface is located is perpendicular to or at an acute angle with a plane on which the light receiving surface is located.

5. The display device according to claim 2, wherein the light receiving surface is integrally formed by at least one Fresnel lens located on a same plane.

6. The display device according to claim 5, wherein the Fresnel lens has at least one annular tooth-shaped structure arranged concentrically and a convex lens structure surrounded by the at least one annular tooth-shaped structure.

7. The display device according to claim 2, wherein the light emitting surface is integrally formed by at least one microlens film located on a same plane, and a plane on which the light receiving surface is located overlaps a plane on which a focal point of the at least one microlens film is located, and the light receiving surface is provided with at least one light transmitting hole, and each of the at least one light transmitting hole is disposed corresponding to each of the at least one microlens film.

8. The display device according to claim 7, wherein light emitted by the light source is refracted by the microlens film to form parallel light beams perpendicular to the light receiving surface when the light transmitting hole overlaps the focal point of the microlens film; or
   the light emitted by the light source is refracted by the microlens film to form parallel light beams at a certain angle with an incident surface when the light transmitting hole is out of focus and is at a focal plane of the microlens film.

9. The display device according to claim 7, wherein the light guiding ring further comprises a metal reflective layer, and the metal reflective layer is disposed on the light receiving surface of the light guide ring at a side toward the light source, and the light transmitting hole is arranged in an array form on the metal reflective layer.

10. The display device according to claim 7, wherein the light source component further comprises a diffused reflection layer, the diffused reflection layer is disposed on the driving circuit board, and the light source is exposed on the diffused reflection layer.

11. The display device according to claim 7, wherein each light transmitting hole is located on a side of the focal point of each corresponding microlens film away from a center of the light guide ring.

12. The display device according to claim 2, wherein the light source comprises one of a light emitting diode (LED) light source or a mini LED light source.

13. The display device according to claim 1, wherein the display device further comprises a camera module located on a side of the display device away from the display panel, and the camera module corresponds to the backlight hole; and
   a control component electrically connected to the camera module and the light source component, wherein the control component controls the light source to be turned off when a camera in the camera module is turned on, and the control component controls the light source to be turned on or off when the camera in the camera module is turned off.

14. The display device according to claim 1, wherein the backlight module further comprises a light blocking film, and the light blocking film is disposed between the light guide ring and the backlight unit.

15. The display device according to claim 1, wherein the light guide ring is made of transparent materials or matte materials.

16. The display device according to claim 1, wherein the display panel comprises:
- a lower polarizer disposed on the backlight module;
- an array substrate provided on the lower polarizer;
- a color filter substrate provided on the array substrate; and
- an upper polarizer disposed on the color filter substrate, wherein the lower polarizer and the upper polarizer are provided with through holes at positions corresponding to the backlight hole.

17. A display device comprising a display panel and a backlight module located on one side of the display panel, wherein the backlight module comprises:
- a backlight unit having a backlight hole;
- a light guide ring disposed inside the backlight hole, wherein the light guide ring comprises a light receiving surface provided away from the display panel and a light emitting surface provided near the display panel, and the light guide ring is configured to direct light beams to a display panel area corresponding to the backlight hole; and
- a light source component configured to provide a light source for the light guide ring, wherein the light receiving surface is integrally formed by at least one Fresnel lens located on a same plane.

18. The display device according to claim 17, wherein the Fresnel lens has at least one annular tooth-shaped structure arranged concentrically and a convex lens structure surrounded by the at least one annular tooth-shaped structure.

* * * * *